United States Patent [19]
Curzio et al.

[11] Patent Number: 5,433,998
[45] Date of Patent: * Jul. 18, 1995

[54] STABILIZED FABRIC WITH WEAVE REINFORCEMENT FOR RESIN MATRICES

[75] Inventors: Frederick H. Curzio, Garden Grove; Peter R. Moores, Anaheim, both of Calif.

[73] Assignee: Textile Products, Inc., Anaheim, Calif.

[*] Notice: The portion of the term of this patent subsequent to May 18, 2010 has been disclaimed.

[21] Appl. No.: 63,891

[22] Filed: May 17, 1993

Related U.S. Application Data

[63] Continuation of Ser. No. 706,023, May 28, 1991, Pat. No. 5,212,010.

[51] Int. Cl.$^6$ ................................................. B32B 7/00
[52] U.S. Cl. ..................................... 428/260; 264/257; 428/257; 428/258; 428/378; 428/408; 428/417; 428/473.5; 428/902
[58] Field of Search ............... 428/260, 257, 258, 408, 428/902, 417, 473.5, 378; 264/257

[56] References Cited

U.S. PATENT DOCUMENTS 5,212,010  5/1993  Curzio et al. ..................... 428/260

OTHER PUBLICATIONS

Trevarno Product Specification Sheet Oct. 15, 1991 Hexcel Products.

Primary Examiner—James J. Bell
Attorney, Agent, or Firm—Willie Krawitz

[57] ABSTRACT

A woven, stabilized fabric suitable for reinforcing resin matrices is provided. The fabric comprises a woven fabric of graphite, fiberglass, aramid, etc., in which a limited amount of a resin coated fiber is woven into one direction of the fabric. Prior to weaving, the resin coated fiber is initially coated with a resin such as an epoxy, polyimide, etc., followed by drying and then weaving into the fabric with as few picks as possible. When the fabric is heated, the resin coat melts and adheres to the fabric, and imparting stabilizing properties thereto. The stabilized fabric is then set up in a mold for resin impregnation, without undergoing undesirable movement.

27 Claims, No Drawings

STABILIZED FABRIC WITH WEAVE REINFORCEMENT FOR RESIN MATRICES

This is a continuation of application Ser. No. 0/706,023 filed on May 28, 1991 now U.S. Pat. No. 5,212,010.

BACKGROUND OF THE INVENTION

This invention relates to a new and improved stabilized and reinforced fabric and its process for manufacture, and to the laminates produced therefrom.

Reinforced fabrics which are employed in resin matrices are frequently formed into stacks or other shapes that require the fabric to be stabilized in a particular position or configuration. Various techniques are known to stabilize the fabric structure for this purpose, and typical publications in the area of fabrics and reinforced fabrics include U.S. Pat. Nos.: 3,844,822; 3,914,494; 4,092,453; 4,237,175; 4,370,784; 4,407,885; 4,410,577; 4,518,640; 4,539,249; 4,590,122; 4,606,968; 4,680,213; 4,714,642; 4,748,996; 4,799,985; 4,818,318; 4,871,491; 4,874,563; 4,902,537.

However, the prior art does not provide a reinforcing structure that can be easily contoured, stacked or positioned, while still retaining its stability as a fabric, when employed as a reinforcement. For example, U.S. Pat. No. 3,914,494 describes a carbon tape reinforced with a small number of weft picks. However, these weft picks only provide reinforcement for a tape width of up to approximately three inches, and this limits its use considerably.

Other fabric structures containing reinforcing thermoplastic binder fibers which stabilize the fabric structure when heated in a stacked assembly, are disclosed in U.S. Pat. Nos. 4,407,885 and 4,680,213. However, the relatively large amounts of thermoplastic fiber employed in the fabric tend to render the fabric structure stiff after a preliminary application of heat to stabilize the fabric.

Many types of fabrics are used to reinforce composites, and it would be desireable to provide a fabric with a reinforcing fiber having a composition which is compatible with the composite matrix. However, in the case of an epoxy matrix, use of an epoxy fiber reinforcement is not usually employed commercially since epoxy resins are not generally formable into fibers. Also, while many polymers can be formed into fibers, the process is expensive, and adds to the cost of a reinforced fabric. Consequently, it is desired to provide a fabric for use in composites, the fabric being sufficiently stabilized so that it is easily manipulated and also conformable to a substrate for subsequent molding, without being too stiff.

THE INVENTION

According to the invention, a stabilized, reinforced fabric is provided for use in a composite resin matrix, the fabric comprising a unidirectional or bidirectional weave of graphite, and the like, and an interwoven, resin coated fiber which is dry at room temperature. When the fabric is heated, the dry resin coat on the fiber will melt and stick to the fabric, thereby stabilizing the fabric structure. This facilitates use of the fabric in cut-outs, in stabilized stacks, and to be reformed for improved conformance in a mold after heating the stack. Also, if the same resin coat for the reinforcing fiber and the matrix material are used, the compatibility between the two resins increases the bond strength between the resin matrix and the fabric when stress is applied to the subsequently formed laminate.

DESCRIPTION OF THE PREFERRED EMBODIMENTS

Typical fibers which may be used as the fabric include carbon, graphite, fiberglass, ceramics, SiC, quartz, boron, metal fibers such as Cu, Al and steel, aramid, etc., and mixtures thereof. Typical resins which may be used to coat the stabilizing fibers in the fabric include bis-maleimides, polyesters, polyethylene, epoxy resins, nylon, PVC, polyether ether ketones, polyphenylene sulfides, polypropylene, bis-maleimides, polysulfones, polyimides, polyethylene, etc. In addition to coating the reinforcing fibers, these resins, along with polyamide-imides, furans, polyetherimides, phenolics, etc., may also be used as the resin matrix.

Instead of employing a polymeric resin matrix which may be reinforced by the fabric of this invention, a metal matrix may be used, such as aluminum, titanium, etc., and the reinforcing fabric would be comprised of a carbon or graphite material.

Following the coating process, the coating is solidified, and the solidified, resin coated fibers are then woven into the fabric. When the fabric is heated, the resin coat will melt and cause the resin coated fiber to adhere to the fabric body. Hence, the resin coated fiber will reinforce and stabilize the fabric body during positioning for lay-ups, cut-outs, stack formation, and for molding purposes, etc.

If an epoxy resin is used to coat the reinforcing fiber, cross linking of the resin coat during the heating step can be avoided by omitting use of a cross linking catalyst in the resin coat. Hence, the resin coat will simply melt when the fabric is heated, but it will not become cross linked. If an epoxy resin also forms the matrix of the composite, the use of a cross linking catalyst in the epoxy matrix will further activate or catalyze the epoxy coating of the fiber. Thus, while the prior art such as U.S. Pat. No. 4,714,642 only discusses the presence of thermoset epoxies in the composite as a whole, in the present invention, it is preferred to avoid cross linking catalysts in the epoxy coated fiber itself.

When epoxy resins are used for transfer moldings, it is preferred that the resin is coated onto the fiber from a hot melt instead of from a solvent. When polyimides are employed, the coating on the fiber may be applied either from a hot melt or from a solvent bath. Preferably, when coating fiberglass from an epoxy melt, the melt temperature should not exceed about 150 C. A suitable diameter for the reinforcing fiberglass is about 2-20 mils, and a typical fiberglass used is designated as 150 1/0. Excess epoxy is removed from the fiberglass, by passing it through a die after it has been coated with epoxy resin contained in a melt tank.

In general, the type of process used to form the resin coating on the reinforcing fiber, whether from a hot melt, solvent, or other system will depend on the resin properties and the economics of the particular process.

The resin coating on the fiber may vary from about 2%-50% by weight of the fiber, and typically will vary from about 20%-45% by weight of the fiber.

Typically, the coated fibers are woven into the fabric as a plain weave with as few picks as possible, say at about 2-10 picks per inch, and usually at about 2-8 picks per inch, and 4 picks per inch are preferred. The weave of the graphite, fiberglass or other fabric itself is typically unidirectional, bidirectional or bias. Use of the reinforcing and stabilizing resin coated fiber in the fabric enables fabric widths to be employed which are in excess of about say six to twelve inches, and usually are from about thirty-six inches to at least sixty inches wide. This represents a distinct advantage over prior art stabilized tapes which, as noted, are only about one and one half to three inches wide.

Preferably, the potential fabric fiber volume is greater than about 55% of the composite, and the weight of weft fiber weave in the fabric varies from about 0.1%–5%, while the weight of the unidirectional (or other) weave in the fabric correspondingly varies from about 99.9%–95%.

A fabric which is suitable as a reinforcement for a resin matrix is comprised of carbon fibers having a unidirectional warp weave, and stabilized by a resin coated weft woven fiber having a density of about 4 picks/inch. The fibers were coated with an epoxy resin, and solidified prior to weaving. The fabric can be then heated on site at the factory to melt the dried resin causing the carbon fibers to adhere to and thus stabilize the fabric. Alternatively, the fabric can be shipped to a user who would perform the heating operation.

After the fabric has been stabilized, it can then be positioned in a variety of configurations for use in stacking, for injection molding, etc., and large sizes can be readily handled during use, without jeopardizing the weave integrity of the fabric.

Following the positioning step, the fabric is impregnated with a resin, in this case preferably an epoxy. Since the resin coat on the fiber does not contain a catalyst, a sufficient excess of catalyst in the epoxy matrix should be present to produce an effective reactive bond between the epoxy coating and the epoxy matrix. Finally, the epoxy matrix is cross linked generally with heat, and pressure and a suitable catalyst to form a laminate.

It will be appreciated that stabilization of the fabric produces a more uniform laminate, which otherwise would not be the case. Also, the stabilized fabric may be readily cut as a preform, handled, stored and shipped, and does not require refrigeration or any other special storage facilities.

We claim:

1. A stabilized, reinforcing fabric for a resin matrix in composites, the fabric being woven in a warp direction, the fabric having a width in excess of about six inches, and stabilizing weft pick fibers woven in the fabric; the weft fibers being coated with a resin prior to weaving; the resin coating on the said weft fibers being adapted to melt when the fabric is heated causing the said weft fibers to adhere to, and stabilize the fabric during handling, and when subsequently positioned in a mold for impregnation by a resin matrix.

2. The stabilized fabric of claim 1, in which the potential fabric volume is greater than about 55% of the composite.

3. The stabilized fabric of claim 1, in which the weight of the weft weave in the fabric is about 0.9%–5% of the total weight of the fabric.

4. The stabilized fabric of claim 1, in which the potential fabric fiber volume is greater than about 55% of the composite, and the weight of the weft weave in the fabric is about 0.1%–5% of the total weight of the fabric.

5. The stabilized fabric of claim 1, in which the resin coating of the weft pick fibers is thermoplastic.

6. The stabilized fabric of claim 1, in which the fabric comprises a material selected from the class consisting of SiC, carbon, graphite, fiberglass, ceramics, quartz, boron, aramid, metal fibers including Cu, Al and steel, aramid, and mixtures thereof.

7. The stabilized fabric of claim 1, in which the resins employed to coat the weft pick fibers are taken from the class selected from epoxy, polyesters, nylon, PVC, polysulfones, polyethylene, bis-maleimides, polyether ether ketones, polyimides, polypropylene and, polyphenlyene sulfide.

8. The stabilized fabric of claim 7, in which the said composite includes a matrix comprising the said coating resins, polyamideimides, phenolics, furans, and polyetherimides.

9. The stabilized fabric of claim 1, in which the impregnating matrix is selected from the class consisting of titanium and aluminum, and the fabric is manufactured of carbon or graphite.

10. The stabilized fabric of claim 8, in which the said matrix is cross linked.

11. The stabilized fabric of claim 1, in which the said coating is a thermoplastic epoxy resin and the said matrix resin is a cross linked epoxy resin.

12. The stabilized fabric of claim 1, in which the said coating is a thermoplastic polyimide resin, and the said matrix resin is a cross linked polyimide resin.

13. The stabilized fabric of claim 1, in which the said resin coating on the weft pick fibers is about 20%–45% by weight of the said fiber.

14. A composite having improved uniform properties following handling of a stabilized reinforcing fabric woven in the warp direction, the composite being formed by curing a resin matrix in the fabric; and, stabilizing weft pick fibers woven into the fabric prior to curing; the weft pick fibers being coated with a resin prior to weaving; the resin coating on the fibers being adapted to melt when the fabric is heated causing the weft pick fibers to adhere to, and stabilize the fabric during handling, and when positioned subsequently in a mold for resin impregnation; the fabric being manufactured in a width in excess of about six inches.

15. The stabilized composite of claim 14, in which the fabric comprises a material selected from the class consisting of SiC, carbon, graphite, fiberglass, ceramics, quartz, boron, aramid, metal fibers including Cu, Al and steel, and mixtures thereof.

16. The stabilized composite of claim 14, including a matrix comprising the said coating resins, polyamideimides, furans, phenolics, and polyetherimides.

17. The stabilized composite of claim 14, in which the weft pick fibers are woven into the fabric at about four picks per inch, the resin coating on the fibers is about 20%–45%, based on fiber weight, and the fabric width is about 36 to at least 60 inches.

18. The stabilized composite of claim 14, in which the resins employed to coat the weft pick weave fibers are selected from the class consisting of epoxy, polyesters, nylon, PVC, polysulfones, polyethylene, bis-maleimides, polyether ether ketones, polyimides, polypropylene and, polyphenlyene sulfide.

19. The stabilized composite of claim 14, in which the impregnating matrix is selected from the class consisting of titanium and aluminum, and the fabric is manufactured of carbon or graphite.

20. The stabilized composite of claim 14, in which the warp weave includes unidirectional, bias and bidirectional.

21. The stabilized fabric of claim 1, in which the warp weave is about six inches to about 60 inches.

22. A process for producing a reinforced composite comprising the steps of forming a reinforcing fabric in a warp direction, for use in the composite, the fabric providing a width in excess of about six inches; interweaving stabilizing weft pick fibers into the fabric; coating the pick fibers with solid resin prior to weaving, the resin coating on the pick weave fibers being adapted to melt when the fabric is heated, causing the weft pick fibers to adhere to, and stabilize the fabric during handling, and when subsequently positioned in a mold for resin impregnation; impregnating the fabric with a resin matrix; and, curing the resin matrix to form the composite.

23. The process of claim 22, in which the warp weave includes unidirectional, bias and bidirectional.

24. The process of claim 22, in which the impregnating matrix is selected from the class consisting of titanium and aluminum, and the fabric is manufactured of carbon or graphite.

25. The process of claim 22, in which the fabric is composed of a material selected from the class consisting of SiC, carbon, graphite, fiberglass, ceramics, quartz, boron, aramid, metal fibers including Cu, Al and steel, and mixtures thereof.

26. The process of claim 22, in which the weft pick fibers are coated with a resin selected from the class consisting of epoxy, polyesters, nylon, PVC, polysulfones, polyethylene, bis-maleimides, polyether ether ketones, polyimides, polypropylene and, polyphenylene sulfide.

27. The process of claim 22, in which the said composite includes a matrix comprising the said coating resins, polyamideimides, phenolics, furans, and polyetherimides.

* * * * *